Dec. 12, 1967  J. TASKER  3,357,677
VALVE WITH DETENT LOCK
Filed March 20, 1964

INVENTOR.
JONATHAN TASKER
BY
*Fay & Fay*
ATTORNEYS

United States Patent Office 3,357,677
Patented Dec. 12, 1967

3,357,677
VALVE WITH DETENT LOCK
Jonathan Tasker, Ann Arbor, Mich., assignor to Crawford Fitting Company, Cleveland, Ohio, a corporation of Ohio
Filed Mar. 20, 1964, Ser. No. 353,339
7 Claims. (Cl. 251—106)

This invention relates to a direct on-off valve featuring a positively locked closed condition and a full flow open condition which is designed for use in fluid or gas systems where low pressure drop across a valve and rapid but positive valve action are necessary. The valve of the invention further incorporates a convenient visual identification of the valve condition which adapts the valve to use in multiple series where quick observation of each valve's off-on condition is desired. The valve is also adapted for in groups for ganged cam shaft operation for sequentially timed action.

Broadly, the invention contemplates a positive-acting on-off valve easily adaptable for control panel mounting, having a body means with an inlet port and an outlet port communicated by a flow passage. A wall portion of the body means defines an easily manufactured, elongated, cylindrical valve seat portion in the flow passage and bore means in the body means intersects the flow passage adjacent the valve seat.

An elongated stem means is slidably mounted in the bore means and the flow passage with an end of the stem means projecting from the bore means to receive forces for moving the stem means to open and closed positions. A first sealing means is provided for slidably sealing the stem means in the valve seat when the stem means is in closed position and a second sealing means is provided for slidably sealing the stem means in the bore means. The first sealing means is arranged so as to permit flow through the flow passage between the stem means and the valve seat when the stem means is in the open position.

The valve assembly further includes stop means for limiting the axial movement of the stem means and a peripheral groove on the stem means between its projecting end and the first sealing means for co-operative locking action with manually operated detent means. The detent means are preferably metal balls mounted in inwardly tapered apertures in the body means, located at points remote from the flow passage on the bore means, to permit locking engagement of the detent means with the peripheral groove of the stem means when the latter is in closed position. The detent locking mechanism further includes sleeve means having separate portions interiorly thereof for detent releasing and detent locking so that the portions may be moved alternately into detent releasing position and detent locking position along the body means.

Suitable spring means are provided for normally urging the sleeve means into detent locking position when the stem means is in closed position and for engaging the stem means to normally urge the same to open position.

Other features of the valve assembly are a detent camming action provided by the tapered sides of the peripheral groove on the stem means and the provision of a projection end of the stem means beyond the sleeve means, such that a visual indicia provided on the stem means is exposed when the latter is in the open position but is hidden within the sleeve means when the stem means is in closed position. Also, a suitable camming surface is provided on the interior of the sleeve means between the detent locking portion and the detent releasing portion, such that the detents will be cammed radially by movement of the sleeve with respect to the body means.

The positive-acting on-off valve constructed according to the principles of the present invention is ideally suited for use in instrumentation systems where a plurality of valves are mounted on a single control panel for ganged or individual operation to regulate the flow of air or other gases or fluids. The valve is also suitable for use in certain processing systems where positive on-off action is desirable.

The quick-acting mechanical operation of the valve constructed according to the principles of this invention permits rapid change of the full-flow condition for alternate full-open and full-closed valve status.

The positive operation of the valve is also advantageous in that it eliminates the need for electrical circuitry or solenoid actuation and provides efficient one-handed changes of the full-flow condition in the valve.

A further advantage of the invention is that it is positively locked when in the closed position, such that even under extreme pressures inadvertent opening of the valve cannot occur.

In a preferred form, the body means of the valve of this invention is a simple T-shaped forging which may be manufactured easily by conventional forging techniques without the use of special molds or tooling, and all of the surfaces of the various components accordingly may be produced by simple machining operations by means of conventional machine tools and metal removing procedures. As contemplated, the valve is extremely simple to assemble and disassemble in that it is constructed of a minimum of component parts.

The prior art valves for instrumentation use generally have utilized a slow action rotary or a non-positive toggle type action and have not permitted the positive and quick-acting operation which the novel valve of the instant invention provides. In addition, these valves have not permitted complete positive locking in the valve closed condition by means of a single detent mechanism as is provided in the valve of the invention. Moreover, the simple visual indicia provided by one form of the invention permits rapid identification of the open and closed condition of a plurality of the valves mounted on an instrument panel in a manner not heretofore known in the prior art.

Another inherent disadvantage of the prior art type of valves has been the necessity for casting or otherwise providing complicated internal passages, seats, and chambers which restrict flow within the valve body. The simplicity of design of the instant invention obviates both flow restriction and this costly and widely used manufacturing process in that standard forgings and conventional mill stock are used for raw materials and the valves are shaped by conventional metal removal techniques and equipment.

With the problems and disadvantages of the prior art devices in mind, it is a general object of the invention to provide a positive-acting on-off valve for use in instrumentation or processing systems which are of extremely simple and efficient design.

It is a further object of the invention to provide a positive-acting on-off valve especially adapted for easy panel mounting in instrumentation systems.

Another object of the instant invention is to provide a positive-acting on-off valve, which may be locked readily in valve closed position or locked open to full flow position by a simple one-handed operation.

It is a further object of the invention to provide a positive-acting on-off valve in which the housing and component parts are extremely simple to manufacture, assemble, and repair.

It is an additional object of the invention to provide a positive acting on-off valve having a visual indicia of the flow condition of the valve conveniently provided thereon.

It is a further and more specific object of the invention to provide, by use of a locking device, a valve closed condition which will not yield under pressure surges within the system or outside vibration which the entire system might be subjected to.

It is a still further and more specific object of the invention to provide a valve of rugged durability do to its freedom from critical surface finishes, critical angle seating, and metal-to-metal seating.

Other and more specific objects of the invention will be apparent from the detailed description to follow.

In the drawings, like numerals are used to designate like parts throughout.

Figure 1:
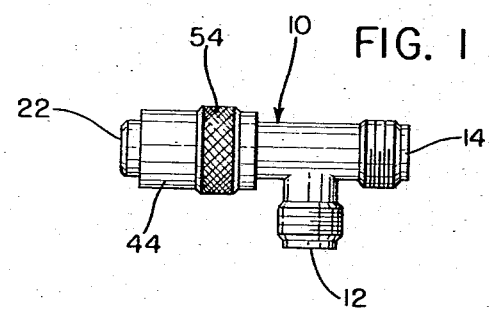
FIG. 1 is an elevational view of the positive-acting on-off valve constructed according to the principles of this invention.

The illustrated embodiment of a positive-acting on-off valve constructed according to the principles of this invention includes a body means 10 having an inlet port 12 and an outlet port 14 communicated by means of a flow passage disposed therethrough. The flow passage is defined by a straight inlet portion 15; a chamber 16, formed by the end of a bore means 17 in the body means 10 intersecting the inlet portion 15; a cylindrical valve seat 18, coaxial with a bore means 17, defined by a wall portion 11 of the body means 10; and a straight outlet portion or radially inwardly directed flange 19 between the valve seat 18 and the outlet port 14. An elongated stem member 20 of varying diameter is slidably mounted in the bore means 17, the chamber 16, and the portion of the flow passage defined by the valve seat 18, with an end 22 of said stem means projecting from the bore means 17 to receive forces for moving the stem means 20 to open and closed position with respect to the valve seat 18.

The stem means 20 has a flanged end 24 of slightly smaller diameter than the valve seat 18 such that it may be received therein. The flange 24 in co-operation with the reduced diameter stem portion 26 and a radially directed shoulder portion 27 of substantially the same diameter as the flange 24 forms a seat for an O-ring or first sealing means 29. A slidable sealing action is established by said first sealing means between the stem means 20 and the valve seat 18 when the stem means 20 moves to the valve closed position. This sealing action permits flow through the flow passage between the stem means 20 and the valve seat 18 through the chamber 16 when the stem means is in the open position.

The arrangements and dimensions of the various elements described are such that upon movement of the stem 20 into and out of the valve closed position, a tapered surface 13 in the wall 11 of the body means 10, between the chamber 16 and the valve seat 18, channels the O-ring 29 and compresses it radially into size to enter the valve seat 18. Behind the shoulder 27 on the valve stem 20 is a tapered surface 30, which does not contact the surface 13 of the body means 10 but which provides a clearance for movement of the O-ring 29 completely into the valve seat 18.

At the larger end of the tapered surface 30 on the stem 20, remote from the O-ring 29, is a cylindrical portion 31 which substantially fills the chamber 16 when the stem 20 is in the closed position with the O-ring 29 in sealing engagement with the valve surface 18. A shoulder 32 located at the end of the enlarged portion 31 opposite the tapered surface 30, co-operates with a reduced diameter portion 33 of the stem 20, and a shoulder portion 34 to form a seat for a second sealing means or O-ring 35 of somewhat larger diameter than the O-ring 29 of the first sealing means. This second O-ring slidably seals the stem means and bore means against leakage at all times.

Both of these O-rings 29 and 35 provide a very effective seal, particularly up to a line pressure of about 250 lbs. per sq. in., when made of 70 to 80 durometer Buna-N or Viton material. The O-ring 35, of course, is continuously seated in the bore 17 such that no tapered wiping surface analogous to surface 13 is necessary.

The shank of the stem means 20 between the shoulder 34 and the projecting end 22 has, intermediate its ends, a peripheral groove 36 having tapered walls 37 for purposes to be explained hereinafter. Between the groove 36 and the shoulder 34, an axial slot 38 of predetermined length is provided such that a set screw 39 or some other appropriate radially inwardly projecting member on the inside of the bore 17 fits in the slot 38 to limit the axial movement of the stem means between the desired open and closed positions, with the O-ring 35 constantly in slidable sealing engagement with the bore 17 and the O-ring 29 alternately moving into and out of slidable sealing engaging with the valve seat 18 to permit the valve to occupy full flow open or closed positions.

Adjacent the end of the bore 17 inwardly tapered apertures 40 are provided in the body means such that they intersect the bore means 17 remote from the flow passage. Detent means 42, in the form of balls having a requisite diameter slightly larger than the smallest diameter of the tapered openings 40, are mounted in the apertures 40 for locking engagement with the peripheral groove 36 when the stem means 20 is in the valve closed position with the O-ring 29 seated in sealing engagement with the valve seat 18.

Figure 3:
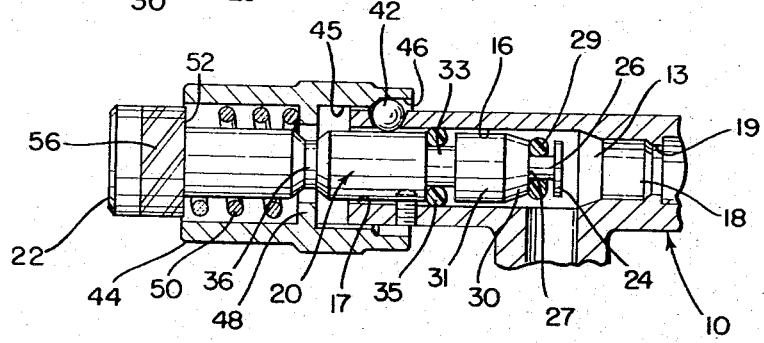
FIG. 3 is a fragmentary cross-sectional view similar to FIG. 2 illustrating the valve components in open position.

Telescopically received on the body means 10 remote from the inlet and outlet ports 12 and 14 is a sleeve 44 having separate portions 45 and 46 respectively on its interior surface for detent locking and detent releasing upon movement of the sleeve to position the portions 45 and 46 alternately in radial alignment with the apertures 40. A tapered surface 47 is provided between the locking surface 45 and the releasing surface 46 such that when the sleeve 44 is in the detent releasing position as shown in FIG. 3, for example, axial movement of the sleeve 44 actually provides a component of force camming the detent balls 42 inwardly.

The sleeve 44 has a radially inwardly directed flange 48 therein which limits movement of the sleeve in a direction toward the central portion of the valve by abutting the end of the body means 10. On the side of the flange 48 opposite the body 10, a spring means 50 is provided normally to urge the sleeve means into detent locking position when the stem means is in closed position. The spring means 50 also acts normally to urge the stem means to open position by abutting a shoulder 52 on the stem 20 which separates the shank portion thereof from the projecting end 22.

The end 22 of stem means 20 is of an enlarged diameter which is just slightly smaller than the bore of the sleeve 44 into which it fits. This provision insures axial alignment of the sleeve for smooth operation of the valve and provides a larger area on which to exert the actuating force.

Moreover, end 22 has indicia 56 in the form of a painted stripe or otherwise marked annular area provided thereon, such that when the valve is in the open condition, the visual indicia stripe 56 is exposed to view, and when the valve is locked in the closed position with the O-ring 29 in contact with the valve seat 18, the visual indicia 56 is hidden within the sleeve as shown in FIG. 1, for instance. This provision enables simplified means for recognition of the condition of the valve at a glance, so that monitoring of a ganged mounting of the valves on an instrumentation panel can be done efficiently and quickly.

The same result may be accomplished by placing an appropriate stripe or marking under surface 46.

Figure 4:
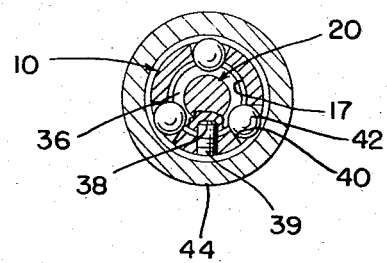
FIG. 4 is a cross-sectional view of the valve taken along the line 4—4 of FIG. 2.

Any convenient number of ball detents may be provided for locking the valve in closed position. However, it has been found especially convenient for three balls and apertures 40 to be provided in the manner and in the arrangement shown in FIG. 4.

On the outside of the sleeve member 44 suitable knurling 54 is provided to facilitate gripping the sleeve for manual movement thereof into detent releasing and detent locking positions.

The operation of the valve is such that movement of the stem 20 by means of a manual force on end 22 exerted against the force of its spring 50 moves the entire valve stem axially with the O-ring 29 being simultaneously squeezed inwardly, by the tapered surface 13 of the flow passageway, into sealing engagement with the valve seat 18 to completely shut off flow through the valve. When the depression of the stem 20 into the valve seat reaches a point where the groove 36 is in line with the aperture 40, the detent balls 42 riding along the shank of the stem 40 are free to move radially into the groove 36.

Figure 2:
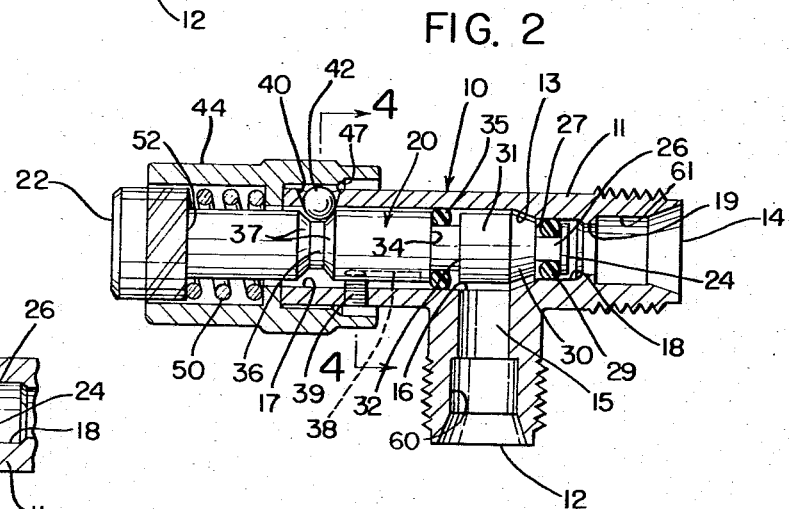
FIG. 2 is a cross-sectional view along an axis of the valve of FIG. 1 when locked in closed position.
Figure 5:
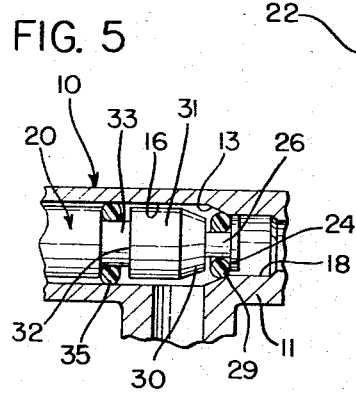
FIG. 5 is a fragmentary cross-sectional view similar to FIG. 2 illustrating the valve components in a partially closed position.

To insure that all of the balls are positively moved radially into the groove 36, the forward motion of the stem 20 creates a force through the spring 50 against the flange 48 of the sleeve 44. This force acts to move the sleeve 44 from the position of detent release shown in FIG. 3, to the position of detent lock, as shown in FIG. 2, such that the camming surface 47 between the surfaces 45 and 46 creates a positive component of radial force which first moves the detent balls into the groove 36 and then permits the locking surface 45 to enter the locking position over the detent balls 42. The action of the spring 50 then, against the locked stem means 20 insures that the sleeve 44 is retained in its normally urged detent locking position with the valve in the valve closed position. It will be noted that at this point the visual indicia 56 is hidden from view in the bore of the sleeve means 44.

When it is desired to change the condition of the valve from closed position to open position, the knurled portion 54 of the sleeve 44 is grasped with one hand and moved axially toward the projecting end 22 of the stem 20, against the force of the spring 50, to a position in which the detent release surface of the sleeve 44 is in radial alignment with the detent balls 42 and thereby permits the balls 42 to be moved radially outwardly as shown in FIG. 3. Simultaneously with this action, the force of the spring 50 acting against the inner flange 48 of the sleeve 44, creates a component of force on the shoulder 52 which moves the stem means 20 in such manner that the O-ring 29 is removed from the valve seat 18. Also, simultaneously with this movement, the tapered side 37 of the peripheral groove 36, acts to create an outward component of force on the balls 42 to move them radially outwardly into the pocket defined by the detent releasing surface 46 and camming surface 47 on the interior of the sleeve 44.

In connecting valves of the invention into flow systems of the type contemplated, external conduits or lines (not shown) are connected to the inlet port 12 and the outlet port 14 and mounted therein. Counterbored recesses 60 and 61 and external or internal threads may be provided in the ends of the inlet port 12 and the outlet port 14 as shown to facilitate connection of the fittings or other external conduit connection means to be used.

As will be seen, the outer peripheral surfaces of the valve of this invention do not require an accurate finish, and the T-shaped forging surface generally needs no more than a rough grinding operation to place it in suitable condition. However, conventional turning operations may be performed thereon to provide a smooth and finished surface for the exterior of the valve if desired. It will be noted, and it is an extremely important part of the invention that all of the interior surfaces of the sleeve and valve body are easily machined by standard techniques and that no casting or elaborate machining operations are necessary. In like manner, the valve stem means 20 is conveniently provided from cylindrical bar stock by suitable turning operations and other conventional metal removing techniques.

The assembly operation of the valve is extremely simple and requires only simple hand operations of assembly, as will be readily apparent from the drawings. It has been found that this valve is extremely suitable for all types of applications in view of this fact and since it is easily disassembled for maintenance and cleaning purposes.

Descriptions of the principles of the invention have been set forth in connection with but a single illustrative embodiment showing one of the preferred forms of the invention. It is not my intention that the illustrated embodiment nor the terminology employed in describing it be limiting inasmuch as variations of these may be made without departing from the spirit of the invention. Rather, I desire they be restricted only by the scope of the appended claims.

The invention claimed is:

1. A positive acting on-off valve comprising body means having an inlet port and an outlet port communicated by a flow passage, a wall portion of said body means defining an elongated cylindrical valve seat portion in said flow passage, bore means in said body means intersecting said flow passage adjacent said valve seat at a first end of said bore means, elongated stem means slidably mounted in said bore means and said flow passage with an end of said stem means projecting from a second end of said bore means to receive forces for moving said stem means to open and closed positions, first sealing means slidably sealing said stem means and said valve seat when said stem means is in said closed position and permitting flow through said flow passage between said stem means and said valve seat when said stem means is in said open position, second sealing means slidably sealing said stem means and said bore means, detent means for selectively locking said stem means in closed poition and a sleeve means slidably mounted on said body means to interact with said detent means to alternately release and lock said detent means.

2. A positive acting on-off valve comprising body means having an inlet port and an outlet port communicated by a flow passage, a wall portion of said body means defining an elongated cylindrical valve seat portion in said flow passage, bore means in said body means intersecting said flow passage adjacent said valve seat, elongated stem means slidably mounted in said bore means and said flow passage with an end of said stem means projecting from said bore means to receive forces for moving said stem means to open and closed position.

first sealing means slidably sealing said stem means and said valve seat when said stem means is in said closed position and permitting flow through said flow passage between said stem means and said valve seat when said stem means is in said open position, second sealing means slidably sealing said stem means and said bore means, stop means limiting the axial movement of said stem means, a peripheral groove in said stem means between said projecting end and said second sealing means, an inwardly tapered aperture in said body means intersecting said bore means at a point remote from said flow passage, detent means mounted in said aperture for locking engagement with said peripheral groove when said stem means is in closed position, sleeve means having separate portions interiorly thereof for detent releasing and dent locking, slidably mounted on said body means for limited movement of said portions alternately into detent releasing position and detent locking position, spring means normally urging said sleeve means into detent locking position when said stem means is in closed position and engaging said stem means to normally urge said stem means to open position.

3. The structure of claim 2 in which the end of the stem means projects beyond said sleeve means.

4. The structure of claim 2 in which the peripheral groove on the stem means has tapered sides.

5. The structure of claim 2 in which the sleeve means has a camming surface which engages the detent means during its movement in and out of the detent locking and releasing positions.

6. The structure of claim 2 in which the projecting end of the stem means has a visual indicia which is exposed outside of the sleeve when the stem means is in open position but which is hidden within said sleeve means when said stem means is in closed position.

7. The structure of claim 2 in which said stop means comprises an axially oriented slot in said stem means and a radially inwardly projecting member mounted in said bore means with its projecting end disposed in said slot.

References Cited

UNITED STATES PATENTS

| | | | |
|---|---|---|---|
| 2,676,781 | 4/1954 | Hobbs | 251—210 |
| 2,701,116 | 2/1955 | Roth | 251—66 |
| 2,704,650 | 3/1955 | Rand | 251—88 X |
| 3,115,330 | 12/1963 | Dollison | 251—111 X |

M. CARY NELSON, *Primary Examiner.*

R. C. MILLER, *Assistant Examiner.*